United States Patent [19]

Meinhard

[11] Patent Number: 5,026,738

[45] Date of Patent: Jun. 25, 1991

[54] PROCESS FOR THE PRODUCTION OF RIGID FOAM COMPRISING ACRYLIC AND/OR METHACRYLIC POLYMERS WITHOUT USING FLUOROCARBONS AS A FOAMING AGENT

[75] Inventor: Stefan Meinhard, Reutlingen, Fed. Rep. of Germany

[73] Assignee: Fraunhofer-Gesellschaft zur Forderung der angewandten Forschung e.V., Munich, Fed. Rep. of Germany

[21] Appl. No.: 466,320

[22] PCT Filed: Nov. 4, 1988

[86] PCT No.: PCT/EP88/01005

§ 371 Date: May 3, 1990

§ 102(e) Date: May 3, 1990

[87] PCT Pub. No.: WO89/04342

PCT Pub. Date: May 18, 1989

[30] Foreign Application Priority Data

Nov. 13, 1987 [DE] Fed. Rep. of Germany ....... 3738624

[51] Int. Cl.$^5$ .................................................. C08J 9/10
[52] U.S. Cl. ...................................... 521/95; 521/88; 521/98; 521/149

[58] Field of Search ................. 521/95, 88, 98, 149

[56] References Cited

U.S. PATENT DOCUMENTS

| | | | |
|---|---|---|---|
| 3,027,336 | 3/1962 | Gotz et al. | 521/149 |
| 3,627,711 | 12/1971 | Schroeder et al. | 521/149 |
| 3,708,444 | 2/1973 | Ganzler et al. | 521/149 |
| 3,734,870 | 5/1973 | Schroeder et al. | 521/149 |
| 4,139,685 | 2/1979 | Schroeder | 521/88 |
| 4,187,353 | 2/1980 | Schroeder | 521/149 |
| 4,314,035 | 2/1982 | Hobes et al. | 521/149 |
| 4,665,104 | 5/1987 | Bitsch | 521/149 |
| 4,939,019 | 7/1990 | Kuo et al. | 521/149 |

*Primary Examiner*—Morton Foelak
*Attorney, Agent, or Firm*—Ostrolenk, Faber, Gerb & Soffen

[57] ABSTRACT

Rigid foam is produced without using fluorocarbons as a foaming agent by mixing an oligomer mixture of monomer and dimers to heximers, flame retardant, nitrogen liberating catalysts, cell regulating agents, foam stabilizer and foam regulator, crosslinking agents and wetting agent, preheating the mixture, and pouring the mixture into a mold, keeping the temperature at a value from 50° to 70° C. and upon completed polymerization removing the product from the mold.

7 Claims, No Drawings

PROCESS FOR THE PRODUCTION OF RIGID FOAM COMPRISING ACRYLIC AND/OR METHACRYLIC POLYMERS WITHOUT USING FLUOROCARBONS AS A FOAMING AGENT

This invention relates to a process for the production of rigid foam comprising acrylic and/or methacrylic polymers by polymerization and foaming of acrylic acid and/or methacrylic acid compounds at elevated temperature in a mold and removal of the foamed plastics from the mold.

FR-A-1 423 844 sets forth a process for the production of foams from polyalkyl acrylates and polyalkyl methacrylates. According to this prior art process, the monomers are polymerized in a first step in the presence of a small amount of azobisisobutyronitrile at a low temperature of about 40° to 45° C. in the course of 6 to 15 hours to give a bubble-free product. In a second step the resulting polymerization product is heated at a temperature within the range of from 170° to 190° C. under vacuum. This known two-step process has the disadvantage that two separated steps have to be carried out and that no continuous production of the foam is possible.

The "Kunststoffberater" 4/76, pages 146, 148 and 150 in general sets forth expanding and foaming agents for foaming plastics. It is stated that there exists no universal expanding agent for all thermoplastics, thermosets and elastomers and that for the production of foamed plastics three different foaming processes exist, which are founded on either chemical, physical or mechanical basis.

U.S. Pat. No. 3,950,314 sets forth the production of bubble-free polymethyl methacrylates. In order to obtain bubble-free products, metal salts are added to the monomeric mixtures. If the use of the metal salts is dispensed with, no foams but solid glass containing undesired individual bubbles will be obtained.

In JP 52-117 987, cited in Hochmolekularbericht 1979, H. 4821/79 and in CPI Profile Booklet 1978, 81851Y/46, the polymerization of a mixture comprising methyl methacrylate and a methyl methacrylate prepolymer is described. The production of foams is not mentioned in this reference.

Furthermore, processes for the production of articles made of foamed polymethyl methacrylate have been known, according to which in a first step a mixture of monomeric methyl methacrylate, a foaming agent which cannot be evaporated at the polymerization temperature and at least one polymerization catalyst is polymerized at a pressure above the evaporation pressure of the foaming agent at the polymerization temperature to give an especially plate-like body. The resulting body is then foamed in a second step by heating to a sufficiently high temperature (cf. DE-PS 3 124 980). In this case, easily volatile fluorocarbons, such as trichlorofluoromethane and trichlorotrifluoroethane are used as liquid inert foaming agents. The use of easily volatile fluorocarbons as the foaming agent increasingly meets with objections and resistance for reasons of environmental protection. Foams result, which have a low weight per unit volume and no smooth surface and thus when used for external insulations require covering for the protection from climate and weather.

DE-PS 3 001 205 sets forth a process for the production foams comprising methacrylic ester. This process has the disadvantage that it also proceeds in two steps and requires several hours.

DE-OS 3 412 142 sets forth a process for the production of hardly inflammable products made of acrylic polymers. According to this process it is operated with excess pressure, both foamed and non-foamed products being producible. The foamed products obtained in this process have no smooth surfaces.

Foams comprising acrylic and/or methacrylic polymers are of growing interest as building materials, since they are transparent, i.e. pervious to light, but not transparent to heat. They are especially well suited as plates, e.g. for glass-houses. When using such foams it is essential that the foams have a smooth surface, so that it is no longer required to cover them with glass or plastics plates. If the foams do not have a smooth surface, dirt and moisture may easily penetrate, and the plates turn unsightly in a short time already. Furthermore, it is of advantage when the resulting foams have smooth edges, so that window frames are no longer necessary for their processing.

The object of this invention is to provide a simple process for the production of foams comprising polyacrylates and polymethacrylates, which does not require the use of admixed fluorocarbons as a foaming agent. According to the invention a process is to be provided, according to which a foam can be obtained in reproducible manner according to a one-step process in a short time. The process is to be carried out continuously and discontinuously. Hardly inflammable foam products are to be obtained in this process. The products produced according to the inventive process are to be transparent, the term transparence being understood to mean that they have a perviousness to light of up to 60 to 70%. The products are to be rigid, so that they can be nailed, and are to be meltable by a hot wire. The surface is to be smooth and non-porous, and the mechanical strength of the foam is to be high.

The products produced according to the inventive process are to be used for external insulations for the protection from cold, rain, etc., as building materials for transparent thermal insulation, preferably in the shape of plates, especially for glass-houses, and in the building field as domelights.

Surprisingly it was found that foams comprising acrylates and/or methacrylates can be produced in simple manner in a short time when using a mixture containing monomeric and oligomeric acrylic and/or methacrylic compounds and catalysts liberating $N_2$ as the catalyst and foaming agent.

The object of the invention is to provide a process for the production of rigid foam having a bulk density ranging from 50 to 100 g/l and being composed of monomeric and polymeric acrylic and/or methacrylic compounds by polymerizing and foaming the acrylic acid and/or methacrylic acid compounds in the presence of catalysts and/or initiators liberating $N_2$ at elevated temperature and upon completed polymerization removing the foam from the mold, which comprises mixing 65.5 to 92.7% by weight of an oligomer mixture containing 10 to 30% by weight of monomer and 90 to 70% by weight of dimers to hexamers and having a viscosity ranging from 300 to 1200 mPa.s and being selected from the group consisting of acrylic acid, methacrylic acid, acrylic acid or methacrylic acid $C_1$-$C_6$ alkyl ester or the mixtures thereof, 5 to 20% by weight of flame retardant, 0.2 to 1.5% by weight of catalysts liberating $N_2$ and being selected from the group consisting of 2,2'- azobis-(2-methylpropanenitrile), 2,2'-azobis-(2,4-dimethylpentanenitrile), 2,2'-azobis-(2-methylbutanenitrile), 1,1'-azobis-(cyclohexane carbonitrile) and the mixtures thereof, 1 to 2% by weight of cell regulating aqent, 0.5 to 3% by weight of foam stabilizer and foam regulator, respectively, 0.5 to 6% by weight of cross-linking agent, 0.1 to 2% by weight of wetting aqent, all weight percentaqes being based on the entire reaction mixture, preheating the mixture to a temperature ranging from room temperature to 40° C., continuously or discontinuously pouring the mixture into molds, keepinq the temperature at a value of from 50° C. to 70° C., optionally cooling it, the temperature control being such that 80° C. are not exceeded, and upon completed polymerization removing the product from the mold. Furthermore, this invention relates to the rigid foam obtained in the process and its use as a building material for transparent thermal insulation. Since the process operates with heating to a relatively low temperature of only 40° to 70° C., only gaseous nitrogen is liberated in the reaction and it can be carried out in one step, the process according to the invention is ecologically beneficial in every respect. It does not require special protective measures or apparatus, which ensure environmental protection or industrial safety against chemical emissions. Because of the low temperatures energy is saved and thus only a very low expenditure is required for conventional installations to carry out the process.

Surprisingly it showed that when using an oligomer mixture comprising acid, methacrylic acid, $C_1$-$C_6$alkyl esters of the acrylic or methacrylic acid a foam can be obtained in simple manner, which has the desired properties. The employed mixture contains 10 to 30% by weight, preferably 15 to 25% by weight, particularly preferably 20% by weight, of the monomeric compound and 90 to 70% by weight, preferably 85 to 75% by weight, particularly preferably 80% by weight, of the oligomers. The oligomers comprise dimers, trimers, etc., up to hexamers and have viscosities within the range of from 300 mPa.s to 1200 mPa.s, preferably 300 mPa.s to 800 mPa.s. Prepolymers having viscosities within the range of from 300 mPa.s to 350 mPa.s are particularly preferred. The prepolymer mixtures are crystal-clear liquids. Such mixtures made of prepolymers are commercially available.

Examples of the alkyl esters of the acrylic and methacrylic acids are methyl, ethyl, n-propyl, isopropyl and n-butyl esters. The $C_1$-$C_3$-esters of the acrylic acid and methacrylic acid are preferred. The methacrylic acid methyl ester is particularly preferred, since it is easily available and inexpensive.

In general, the commercially available mixtures are marketed as "prepolymers" and contain the monomer and the dimers to hexamers of a compound, for example the acrylic acid or the methacrylic acid methyl ester. Of course, mixtures of the various above-mentioned compounds may also be used in the process according to the invention.

The reaction mixture which is polymerized contains 65.5 to 92.7% by weight, preferably 70 to 85% by weight, of oligomers, based on the reaction mixture to be polymerized. The amount used in practice depends on the weight per unit volume. If for example a foam having very low weight per unit volume is desired, the amount of oligomer mixture will be within the lower range. It can be determined by the person skilled in the art by simple preliminary tests.

According to the invention all of the products which are commercially available as flame retardants for plastics may be used as flame retardants. Known flame retardants for plastics are: chlorinated paraffins, chlorinated bicyclic compounds, pentabromodiphenyl ether, tetrabromobisphenol A, tetrahalophthalic anhydride, tris(2,3-dibromopropyl) phosphate (cf. the summary by Jenker (Plaste Kautschuk 24 (1977) pages 415 to 418) and Kerscher (Kunststoff-Journal 13 (1979) No. 1, pages 6 to 14). Inorganic phosphorus compounds, organic phosphonic acids, phosphines as well as halogenated phosphoric esters are suitable as flame retardants for the foam according to the invention (Dang and Wortmann, Kunststoff-Journal 10 (1976), No. 1/2, pages 8 to 10). According to the invention phosphorus-containing flame retardants are particularly preferred for transparent plastics and sheets as described by R. Wolf (Kunststoffe 76 (1986), page 943). It is particularly preferred to use Sandotlam 5087 and Fyrol CEF (Tris-($\beta$-chloroethyl) phosphate). In principle, all flame retardants which provide sufficient flame protection and do not disadvantageously influence the transparence of the resulting foam may be used. Compounds recommended for cast polymethacrylate, unsaturated polyesters and polyurethanes yielding transparent products are particularly preferred.

The amount of flame retardant is from 5 to 20% by weight and preferably from 10 to 15% by weight. Of course, mixtures of flame retardants containing at least two different flame retardants may also be used.

In the process according to the invention the catalysts used are catalysts liberating nitrogen and breaking within a range of from 40° C. to 70° C. At 52° C., a suitable catalyst has, e.g., a half life of 12 hours. Examples of suitable catalysts are the compounds commercially available under the name of VAZO ®, such as 2,2 -azobis(2-methylpropanenitrile), 2,2'-azobis(2,4-dimethylpentanenitrile), 2,2'-azobis(2-methylbutanenitrile), 1,1 -azobis(cyclohexanecarbonitrile). Mixtures of these catalysts may also be used. These catalysts have the advantage that they are very photostable and not susceptible to impact or shocks, i.e. can be handled easily and safely. They contain no oxygen and do not effect cross-linkage.

According to the invention 0.2 to 1.5% by weight, preferably 0.8 to 1.2% by weight, of catalysts are used. It was surprising and not obvious to the person skilled in the art that the catalysts liberating $N_2$ do not only effect polymerization of the reaction mixture but simultaneously effect foaming. The catalysts are used in very small amounts and it could not be foreseen that they effect foaming.

Furthermore, it is of importance that 1 to 2% by weight of cell regulating agent is used in the process according to the invention. Such cell regulating agents are commercially available. The cell regulating agent influences the size of the pores. It is assumed that the foam produced according to the invention contains closed pores. However, it cannot be excluded that a portion of open pores is also present. Examples of cell regulating agents are thermocurable silicones sold under the name of Tego ® silicone acrylates RC 705 and RC 710.

Preferably those ones on a silicone polyether basis are used, which are commercially available and offered for the production of polyurethane foams. The amount is from 1 to 2% by weight, preferably 1.5% by weight.

The mixture to be polymerized contains 0.5 to 3% by weight, preferably 1 to 2% by weight, of foaming stabilizer or foaming regulator. The foam stabilizers or foam regulators are offered commercially. Preferably those ones are used which are commercially available for polyurethane foams. Examples are silicones modified with polyether. An examples of a commercial product is Tegostab 8300, an alkyleneoxide-modified dimethylsiloxane.

Silicone foam stabilizers or foam regulators on the basis of silicone fluids are preferably added. These silicone compounds have functional groups, especially functional acrylic oligomers of the following formula, which are bound to a silicone skeleton:

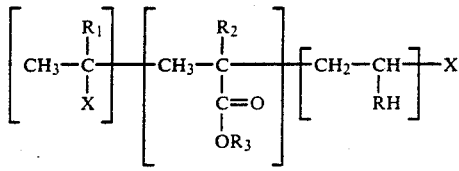

wherein X represents a carboxy, hydroxy or epoxy group.

Polyether silicones containing functional carboxy or epoxy groups and polyether-1,3-diols such as polyetherol having prolonged alkyl side chains, polyetherols having aromatic structural units and high-molecular polypropylene oxide may also be used for this purpose, always provided that they are compatible with the foams resulting from the monomers and oligomers. Polyether silicones (copolymers) are preferably used. Such foam stabilizers or foam regulators are commercially offered in many different kinds.

According to the invention 0.5 to 6% by weight, preferably 1 to 3% by weight, of cross-linking agent are used. Such products are commercially available for the polymerization of acrylic and methacrylic derivatives. An example of a cross-linking agent is Pleximon 786, a trimethylolpropane trimethacrylate.

Finally, 0.1 to 2% by weight, preferably 0.5 to 1.5% by weight, of wetting agent are used in the process according to the invention. The wetting agents used for acrylate and methacrylate foams may be wetting agents commercially available for methacrylic acid methyl ester. They include alkylphenyl ethoxylates of nonionic character. The surface activity of such wetting agents is also given by the presence of a hydrophilic and hydrophobic portion. The chemico-physical and application oriented properties are determined by the ratio of the hydrophilic polyglycol ether group to the hydrophobic alkylphenol portion. Various degrees of ethoxylation lead to products having different properties, which may be used for different intended purposes. According to the invention ethoxylation degrees between 6 and 9, preferably of 8, proved to be successful. Virtually all of such commercially offered products may be used. The Lutensol AP products of BASF are examples of commercial products which may be used. The Lutensol AP products include ethoxylation products, whose basis is nonylphenol. The mixture consisting of the above components may additionally contain up to 3 parts by weight, preferably up to 1 part by weight, based on 100 parts by weight of the above reaction mixture, of conventional additives such as dyes, UV stabilizers, etc. All of the abovementioned components are weighed in the amounts required and fed into a container where they are thoroughly mixed. The mixture is heated, e.g. fed through a heating pipe and pre-heated to a temperature within the range of from 30° to 45° C., preferably 40° C., and inserted in the mold. In a predetermined amount, the mixture may be fed discontinuously into molds, preferably closed molds, or it can be supplied continuously to a belt as such, which has the shape of a mold, or to a mold on a belt in a certain measured amount. The mold is preferably provided with a cover. The mixture is kept at a temperature within the range of from 50° C. to 70° C. At this temperature polymerization and foaming take place simultaneously. The temperature is measured continuously, and since the reaction proceeds exothermally, further heating is generally not required. In the process according to the invention attention must be paid to the fact that a temperature of 80° C. is not exceeded, since then there is the danger that the foam formed turns turbid. It has to be cooled when reaching 80° C. at the latest, preferably already at 70° C. In a preferred embodiment of the invention the mold into which the reaction mixture is fed is preheated to a temperature the same to which the reaction mixture is pre-heated.

The process according to the invention may be carried out continuously and discontinuously. A particularly preferred embodiment of the process according to the invention is continuous carried-out. The reaction mixture is supplied from the container in free-flowing manner through a heating pipe onto a conveyor belt. It is particularly remarkable and advantageous that the process according to the invention proceeds at atmospheric pressure and that it is not required to operate at excess pressure. Within a period of from 20 to 60 minutes, usually within a period of up to 30 minutes, polymerization and foaming are completed. The resulting product is cooled in air and removed from the mold.

The products obtained with the process according to the invention have a smooth surface, they are rigid and can for example be nailed. They have a weight per unit volume of from 50 to 100 g/l, preferably of 80 g/l. The pore size is within a relatively large range and may be within the range of from 1 to 8 mm, preferably within the range of from 3 to 5 mm. If the foams produced according to the invention are used for thermal insulation, the pore size does not play a major part, since thermal insulation does not depend on the size of the pores and the differences in thermal insulation are relatively small with large and small cells. However, the larger the cells, the better the perviousness to light, i.e. transparence, and the lower the weight per unit volume. The size of the pores may be regulated by the amount of foam regulator, the amount of foaming agent and the amount of composition supplied to the mold, and the suitable amounts may be easily determined by means of preliminary tests. The resulting products have a high degree of perviousness to light and a smooth non-porous surface. Such products could not be produced according to any of the known processes.

The following examples explain the invention.

EXAMPLE 1

83.4 parts by weight of low viscous methacrylic acid methyl ester having a viscosity of 350 mPa.s, i.e. a prepolymer of the methacrylic acid methyl ester, commercially available under the name of DEGALAN S 340 sold by Messrs. Degussa, are well mixed with 12 parts of weight of chlorinated alkylphosphate, a flame retardant (Fyrol F 2; Stauffer Chemical Corp.). 0.6 part by weight of of 2,2'-azobis(2,4-dimethylpentane) nitrile are added to the mixture as the catalyst liberating nitrogen. The catalyst is commercially available under the name of Vazo 52. Added thereto are 1.5 parts by weight of alkyleneoxidemodified dimethylsiloxane commercially available under the name of Tegostab 8300 as the cell-regulating agent, 0.5 part by weight of silicone acrylate commercially available under the name of RC 710 as the stabilizer, 0.5 part by weight of non-ionic wetting agent on the basis of nonylphenol having 8 ethyleneoxide units, which is commercially available under the name of Lutensol AP 8, as the wetting agent, and 0.5 part by weight of polyglycol-400-dimethacrylate and 1 part by weight of trimethoxysilane commercially available under the name of GF 31 as the cross-linking agent.

After thoroughly mixing, the mixture is preheated to 35° C. in a mixing vessel and applied to a revolving endless conveyor belt via a heated supply line. The conveyor belt consists of a closed aluminum mold coated and/or lined with a silicone material. A certain measured amount is supplied to the conveyor belt, so that the conveyor belt is not completely filled. In transport the conveyor belt is heated such that the mixture is heated to a temperature of from 60° C. to 70° C. At this temperature the reaction mixture foams and polymerizes. The temperature is measured continuously by means of temperature sensors. Polymerization and foaming are completed after about 20 minutes. A well transparent, opaque fine-cellular foam is obtained. After polymerization and foaming the foam fills the entire space of the mold. When removing it from the conveyor belt plates of varying sizes may be sawed off. If, for example a belt having 30 cm in width is used and the plates are sawed off after 1 m, plates of 30×100 cm can be produced. According to Example 1 plates having a thickness of 10 mm are produced.

EXAMPLE 2

84.5 parts by weight of low viscous methacrylic acid methyl ester having a viscosity of 350 mPa.s, i.e. a prepolymer of the methacrylic acid methyl ester, commercially available under the name of DEGALAN S 340 sold by Messrs. Degussa, are well mixed with 5 parts by weight of chlorinated alkyl phosphate, a flame retardant (Fyrol F 2; Stauffer Chemical Corp.) and 7 parts by weight of phosphorinane (Sandotlam 5087), a flame retardant. 0.5 part by weight of 2,2'-azobis(2,4-dimethylpentane) nitrile is added to the mixture as the catalyst liberating nitrogen. The catalyst is commercially available under the name of Vazo 52. Added thereto are 1 part by weight of alkyleneoxide-modified dimethylsiloxane commercially available under the name of Tegostab 8300 as the cell-regulating agent, 0.8 part by weight of silicone acrylate commercially available under the name of RC 705 as the stabilizer, 0.5 part by weight of non-ionic wetting agent on the basis of nonylphenol having 8 ethyleneoxide units, which is commercially available under the name of Lutensol AP 8, as the wetting agent and 1 part by weight of trimethoxysilane commercially available under the name of GF 31 is added as the cross-linking agent.

Example 1 was repeated, however a mold having a height of 15 mm being used. It showed that temperatures of 70° C. were obtained during polymerization. Thus, the belt was cooled in such a way that 75° C. were not exceeded. The polymerization was completed after 30 minutes.

A foam coarser than that of Example 1, which has a medium-fine cellular structure, is obtained. The polymerization and foaming time is about 15 minutes.

EXAMPLE 3

81.9 parts by weight of low viscous methacrylic acid methyl ester having a viscosity of 350 mPa.s, i.e. a prepolymer of the methacrylic acid methyl ester, commercially available under the name of DEGALAN S 340 sold by Messrs. Degussa, are well mixed with 10 parts by weight of chlorinated alkylphosphate, a flame retardant (Fyrol F 2; Stauffer Chemical Corp.). 0.8 part by weight of 2,2'-azobis(2,4-dimethylpentane) nitrile are added to the mixture as the catalyst liberating nitrogen. The catalyst is commercially available under the name of Vazo 52. Added thereto are 2.0 parts by weight of alkyleneoxidemodified dimethylsiloxane commercially available under the name of Tegostab 8300 as the cell-regulating agent, 0.8 part by weight of silicone acrylate commercially available under the name of RC 710 as the stabilizer, 2.0 parts by weight of non-ionic wetting agent on the basis of nonylphenol having 8 ethyleneoxide units, which is commercially available under the name of Lutensol AP 8, as the wetting agent, and 1.0 part by weight polyglycol-400-dimethacrylate and 1.5 parts by weight of trimethoxysilane commercially available under the name of GF 31 as the cross-linking agent.

It is operated as set forth in Example 1. A foam of coarse structure having a weight per unit volume of 80 g/l is obtained. This foam has a very stable skin. Polymerization and foaming are completed within 15 minutes.

I claim:

1. A process for the production of rigid foam having a bulk density ranging from 50 to 100 g/l and being composed of monomeric and polymeric acrylic and/or methacrylic compounds by polymerizing and foaming the acrylic acid and/or methacrylic acid compounds in the presence of catalysts and/or initiators liberating $N_2$ at elevated temperature and upon completed polymerization removing the foam from the mold, which comprises mixing 65.5 to 92.7% by weight of an oligomer mixture containing 10 to 30% by weight of monomer and 90 to 70% by weight of dimers to hexamers and having a viscosity ranging from 300 to 1200 mPa.s and being selected from the group consisting of acrylic acid, methacrylic acid, acrylic acid or methacrylic acid $C_1$–$C_6$ alkyl ester or the mixtures thereof, 5 to 20% by weight of flame retardant, 0.2 to 1.5% by weight of catalysts liberating $N_2$ and being selected from the group consisting of 2,2'-azobis-(2-methylpropanenitrile), 2,2'-azobis-(2,4-dimethylpentanenitrile), 2,2'-azobis-(2-methylbutanenitrile), 1,1'-azobis-(cyclohexane carbonitrile) and the mixtures thereof, 1 to 2% by weight of cell regulating agent, 0.5 to 3% by weight of foam stabilizer and foam regulator, respectively, 0.5 to 6% by weight of cross-linking agent, 0.1 to 2% by weight of wetting agent, all weight percentages being based on the entire reaction mixture, preheating the mixture to a temperature ranging from room temperature to 40° C., continuously or discontinuously pouring the mixture into molds, keeping the temperature at a value of from 50° C. to 70° C., optionally cooling it, the temperature control being such that 80° C. are not exceeded, and upon completed polymerization removing the product from the mold.

2. The process according to claim 1, which is carried out continuously.

3. The process according to claim 1 in which the amount of oligomer mixture is 70-85% and the amount of monomer therein is 15-25% and the viscosity is 300-800 cps, the amount of flame retardant is 10-15%, the amount of catalyst is 0.8 to 1.2%, the amount of foam stabilizer and foam regulator is 1-2%, the amount of cross-linking agent is 1-3% and the amount of wetting agent is 0.5 to 1.5%.

4. The process according to claim 3 in which the viscosity is 300-350 cps.

5. The process according to claim 4 in which the oligomer mixture is of methacrylic acid methyl ester, the catalyst is 2,2'-azobis-(2,4-dimethylpentanenitrile), the cross-linking agent is trimethylolpropane trimethacrylate, and the wetting agent is an alkylpenyl ethoxylate having a degree of ethoxylation between 6 and 9.

6. The process according to claim 5 in which the amount of monomer is 20% and the amount of cell regulating agent is 1.5%.

7. The process according to claim 1 in which the amount of monomer is 20% and the amount of cell regulating agent is 1.5%.

* * * * *